United States Patent
Bryan

(10) Patent No.: US 12,467,554 B2
(45) Date of Patent: Nov. 11, 2025

(54) CONTROLLING AN ACTUATOR ON A VALVE

(71) Applicant: Dresser, LLC, Houston, TX (US)

(72) Inventor: Kyle McKinley Bryan, Jacksonville, FL (US)

(73) Assignee: Dresser, LLC, Houston, TX (US)

( * ) Notice: Subject to any disclaimer, the term of this patent is extended or adjusted under 35 U.S.C. 154(b) by 313 days.

(21) Appl. No.: 17/878,429

(22) Filed: Aug. 1, 2022

(65) Prior Publication Data
US 2024/0035589 A1 Feb. 1, 2024

(51) Int. Cl.
*F16K 37/00* (2006.01)
*F16K 31/42* (2006.01)

(52) U.S. Cl.
CPC .......... *F16K 37/0033* (2013.01); *F16K 31/42* (2013.01)

(58) Field of Classification Search
CPC ............................ F16K 37/0033; F16K 31/42
USPC .................................................. 137/554, 556
See application file for complete search history.

(56) References Cited

U.S. PATENT DOCUMENTS

| | | | | |
|---|---|---|---|---|
| 4,274,438 A * | 6/1981 | La Coste | ............... | G01L 5/0061 91/1 |
| 4,597,556 A * | 7/1986 | Sandling | .................. | F16K 31/54 74/109 |
| 4,647,003 A * | 3/1987 | Hilpert | ................ | F16K 31/1635 137/554 |
| 4,869,459 A * | 9/1989 | Bourne | ............... | F16K 31/1635 251/294 |
| 5,269,343 A * | 12/1993 | Trapp | ..................... | F16K 31/502 251/266 |
| 5,278,530 A * | 1/1994 | Zovath | .................. | H01H 36/00 335/185 |
| 5,411,239 A * | 5/1995 | Sorensen | ............... | F16K 31/163 251/255 |
| 6,119,715 A * | 9/2000 | Russell | ................ | H02B 13/055 220/88.1 |
| 6,343,615 B1 * | 2/2002 | Miller | ..................... | A62C 35/68 137/554 |
| 7,044,444 B2 * | 5/2006 | Haubold | ............. | F15B 15/2807 137/554 |
| 7,081,059 B2 * | 7/2006 | Iwamoto | .................. | G01B 7/02 137/554 |
| 8,485,498 B2 * | 7/2013 | Takeda | ................ | F16K 37/0041 251/231 |

(Continued)

FOREIGN PATENT DOCUMENTS

DE 202018103257 U1 * 8/2018 ............ F16K 11/044
WO 2015121285 A1 8/2015

OTHER PUBLICATIONS

DE-202018103257-U1—Espacenet Translation (Year: 2018).*
Product manual, "Becker Digital Natural Gas Positioner (DNGP)" (2012), GE Oil & Gas.

*Primary Examiner* — Daphne M Barry
(74) *Attorney, Agent, or Firm* — Paul Frank + Collins P.C.

(57) ABSTRACT

A controller is configured to operate a flow control. These configurations may operate an actuator that is part of an industrial valve. In one implementation, the controller may include a solenoid valve that couples with the actuator. The controller may utilize feedback from the valve, for example, sensor data, to identify changes that it needs to make to the solenoid valve. These changes can direct flow to different sides of the actuator.

16 Claims, 6 Drawing Sheets

(56) References Cited

U.S. PATENT DOCUMENTS

| | | | | |
|---|---|---|---|---|
| 8,517,333 | B2* | 8/2013 | Briley | F16K 37/0033 |
| | | | | 137/554 |
| 9,341,282 | B2* | 5/2016 | Robson | F16K 5/04 |
| 9,618,136 | B2* | 4/2017 | Bell | F16K 37/0041 |
| 10,066,761 | B1* | 9/2018 | Hernu | F16K 37/0033 |
| 10,166,710 | B2* | 1/2019 | Tan | G05B 19/402 |
| 11,454,334 | B1* | 9/2022 | Betley | F16K 31/12 |
| 2008/0234516 | A1 | 9/2008 | Niddam-Hildesheim et al. | |
| 2010/0055329 | A1 | 3/2010 | Chiang et al. | |
| 2010/0152907 | A1* | 6/2010 | Meier | F16K 37/0091 |
| | | | | 700/282 |
| 2012/0055329 | A1* | 3/2012 | Heer | F15B 20/002 |
| | | | | 91/403 |
| 2015/0184772 | A1* | 7/2015 | Inagaki | F16K 31/60 |
| | | | | 251/30.01 |
| 2021/0041038 | A1* | 2/2021 | Götz | F16K 31/42 |

* cited by examiner

CONTROLLING AN ACTUATOR ON A VALVE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. These devices may include control valves, which provide active control of flow through an exchange of control signals with a central control network or remote control station. In oil and gas pipelines and facilities, operators may deploy control valves that have components that move (e.g., translate, rotate, etc.) to restrict or permit flow of hydrocarbons, like natural gas. An actuator often accompanies the valve. This actuator uses actuating media, for example, natural gas from the network, to generate a force that moves the components to appropriate position(s). Feedback on the device, often a large, mechanical linkage, is useful to help manage the position(s).

SUMMARY

The subject matter of this disclosure relates to improvements to manufacture or construction of control valves. One of the embodiments deploys a pneumatic/electric controller to control a pneumatic actuator to position a closure member, like a ball or plug on the valve. The controller may incorporate a non-contact sensing unit, like a Hall-effect sensor. This sensor provides feedback that the controller uses to operate an instrumentation valve, for example, a solenoid valve. This design manages pressure at the actuator, which in turn regulates position of the closure member. The arrangement is beneficial because it does not bleed any gas at steady state, which means that the device only discharges actuating media, like natural gas, to the atmosphere in response to position movements of the control valve. The arrangement also simplifies assembly of the control valve itself because the non-contact sensing unit provides a compact alternative to mechanical feedback that requires "long stroke" movements to identify position of the closure member. An underlying benefit is that the embodiments also reduce hydrocarbon emissions (for example, methane emissions) because the external instrumentation valve does not continuously "bleed" actuating media that pressurizes the actuator.

DRAWINGS

This specification refers to the following drawings.

Figure 1:
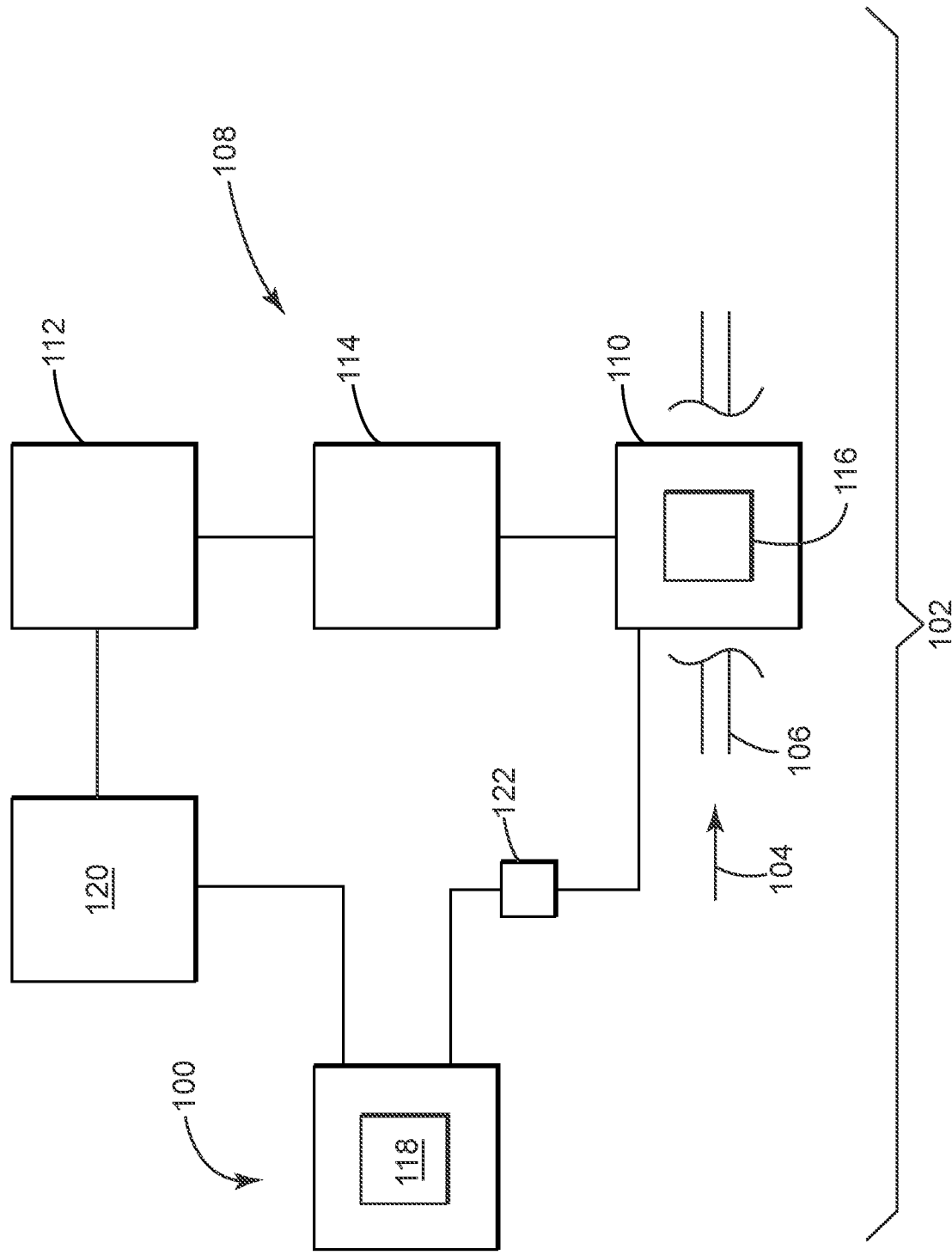
FIG. 1 depicts a schematic diagram of an exemplary embodiment of a controller.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in the drawings noted above. These examples use a control device, or "controller," to direct movement or operation of a control valve. However, the proposed design is configured to reduce hazardous emissions into the atmosphere because it does not constantly bleed actuating media (like natural gas) at steady state. These configurations also simplify assembly of certain flow controls, like control valves for use in industrial applications, because the control logic does do not require any large mechanical linkage for position feedback. The resulting device not only offers accurate position control, which is important to maintain process parameters on a process line, but also reduces emissions of potential fugitive gases from the device. Other embodiments are within the scope of this disclosure.

FIG. 1 depicts a schematic diagram of an example of a control unit 100. This example is found in a distribution network 102, typically designed to carry material 104 through a network of conduit 106. The control unit 100 may be part of a flow control 108 that has a valve body 110 to connect in-line with the conduit 106. The device may also have actuator 112. A torque unit 114 may couple the actuator 112 with a closure member 116. In one implementation, the control unit 100 may have operating hardware 118 that couples with an instrument valve(s) 120. A sensor 122 may provide feedback to the operating hardware 118.

Broadly, the controller 100 may be configured to regulate flow of fluids, typically gasses. These configurations may include devices that can receive instructions to regulate flow of material through a flow control. The device may compare the instructions with feedback about components in the flow control. This feature may indicate that flow is or is not appropriate. If it is not, the device can make changes to the flow control to regulate flow to meet process or other flow parameters concomitant with application of the device in, for example, a process line.

The distribution system 102 may be configured to deliver or move resources on or as part of the process line. These configurations may embody vast infrastructure. Material 104 may comprise gases, liquids, solids, or mixes, as well. The conduit 106 may include pipes or pipelines, often that connect to pumps, boilers, compressors, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast, forged, or machined metals. This structure may form a flange at openings I, O. Adjacent pipes 106 may connect to these flanges. The actuator 112 may use pressurized natural gas and, along with a piston, spring (or springs), or a flexible diaphragm, generate a load. The torque unit 114 may translate the load (from the actuator 112) into rotary movement. This feature can change position of the closure member 116, typically a ball, plug, or disc.

The operating hardware 118 may be configured to manage this position. These configurations may embody devices that can process data. These devices may include computing components, like processors or memory, that can utilize firmware, software, or other executable instructions to perform certain algorithms or method steps. These algorithms may, for example, process inputs and, in turn, generate an operating signal to change the state of the instrument valve 120, often a solenoid valve. The state may control a pneumatic signal $S_1$ that pressurizes the actuator 112 to move the closure member 116 to its prescribed position.

The sensor 122 may be configured to define a measured position for the closure member 116. These configurations may include devices that leverage non-contact modalities to generate data that corresponds with the measured positions. Devices that use magnetics may prevail, for example. In one implementation, a Hall-effect sensor may reside in close proximity to one or more magnets that rotate concomitantly with the torque unit 114.

Figure 2:
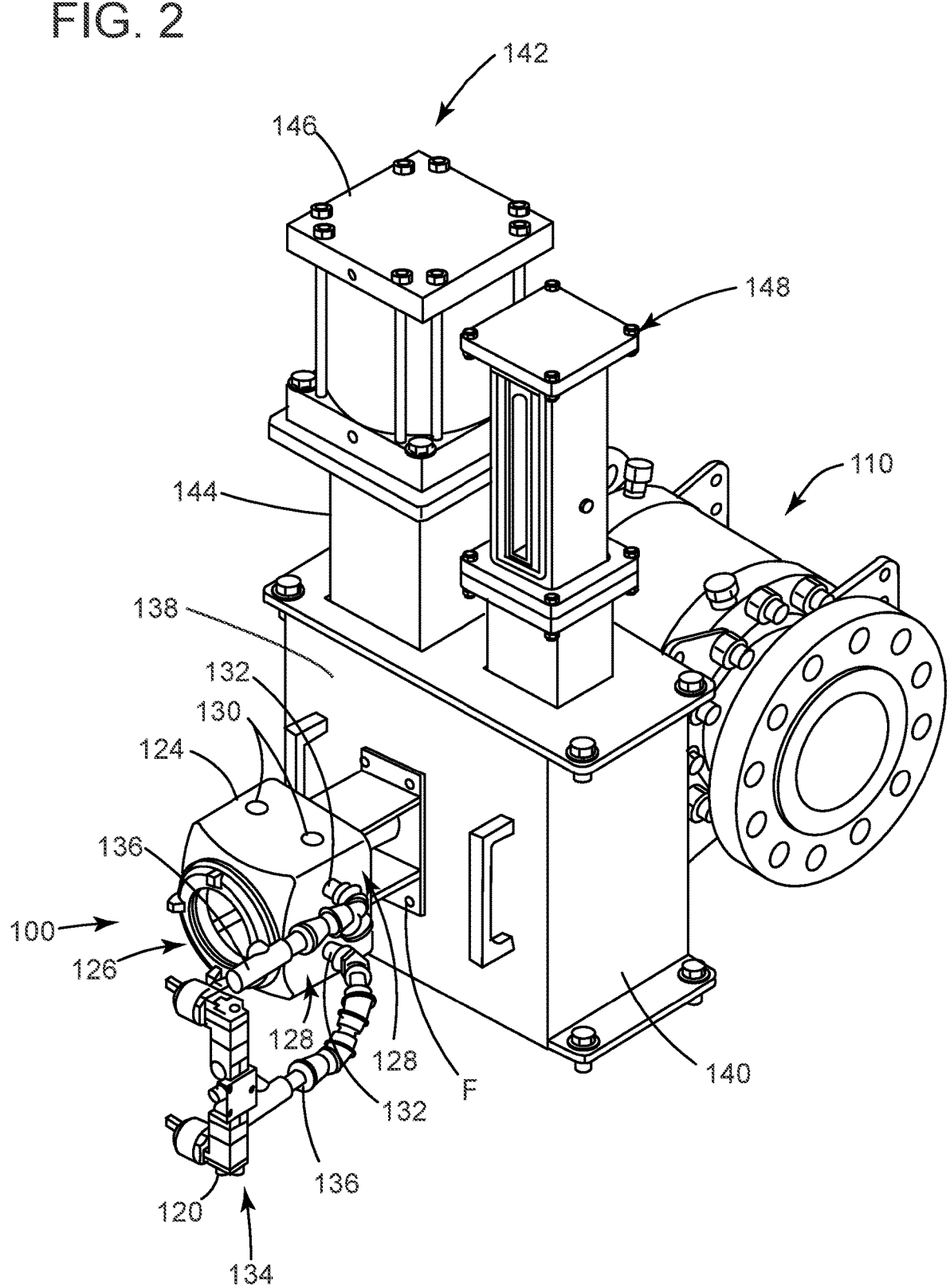
FIG. 2 depicts a perspective view of an example of the controller of FIG. 1.

FIG. 2 depicts a perspective view of exemplary structure for the controller 100 of FIG. 1. The sensor 122 may reside in an enclosure 124, preferably an "explosion-proof" housing or housing with construction that prevents or retards ignition of gas inside. The enclosure 124 may have a window 126 for a technician to view inside of this housing. In one implementation, an electronic display screen may replace or accompany the window 126, as desired. Ports 128 may also provide access to the inside of the enclosure 124, as well. The ports 128 may include control ports 130, shown here on top of the enclosure 124. The control ports 130 may allow control cabling to connect with operating hardware 118. This cabling may carry a control signal from the central control network or remote control station in the form of a 4-20 mA signal. A 12 or 24 volt power signal might be useful as well. As also shown, ports 132 may allow wires or cables to extend from the operating hardware 118 to parts of an instrumentation valve system 134. These wires may extend through conduits 136 to connect with the instrumentation valve(s) 120. In one implementation, the instrumentation valve(s) 120 may embody a solenoid valve that couples with the actuator 112. The solenoid valve(s) may change state to control flow of pressurized actuating media into and out of the actuator 112. Double-acting or single acting solenoid(s) may be useful for this purpose.

Structure for the actuator 112 may accommodate use of controller 100. This structure may include a mount 138 to receive the enclosure 124. The mount 138 may couple to a base 140, for example, by way of fasteners F, like screws or bolts. The base 140 can support the valve body 110. As also shown, the base 140 may support a load generator 142 that may include a spring cartridge 144 and a pneumatic cylinder 146. Other components, like a travel scale 148, may also secure to the base 140. In one implementation, the wired conduit 136 may allow a signal to transit from the operating hardware 118. This signal may open or close parts of the solenoid valve(s) 120. This feature allows actuating media to pressurize or vent from different sides of the pneumatic cylinder 146. These changes in pressure adjust the position of the closure member 116 in the valve body 110.

Figure 3:
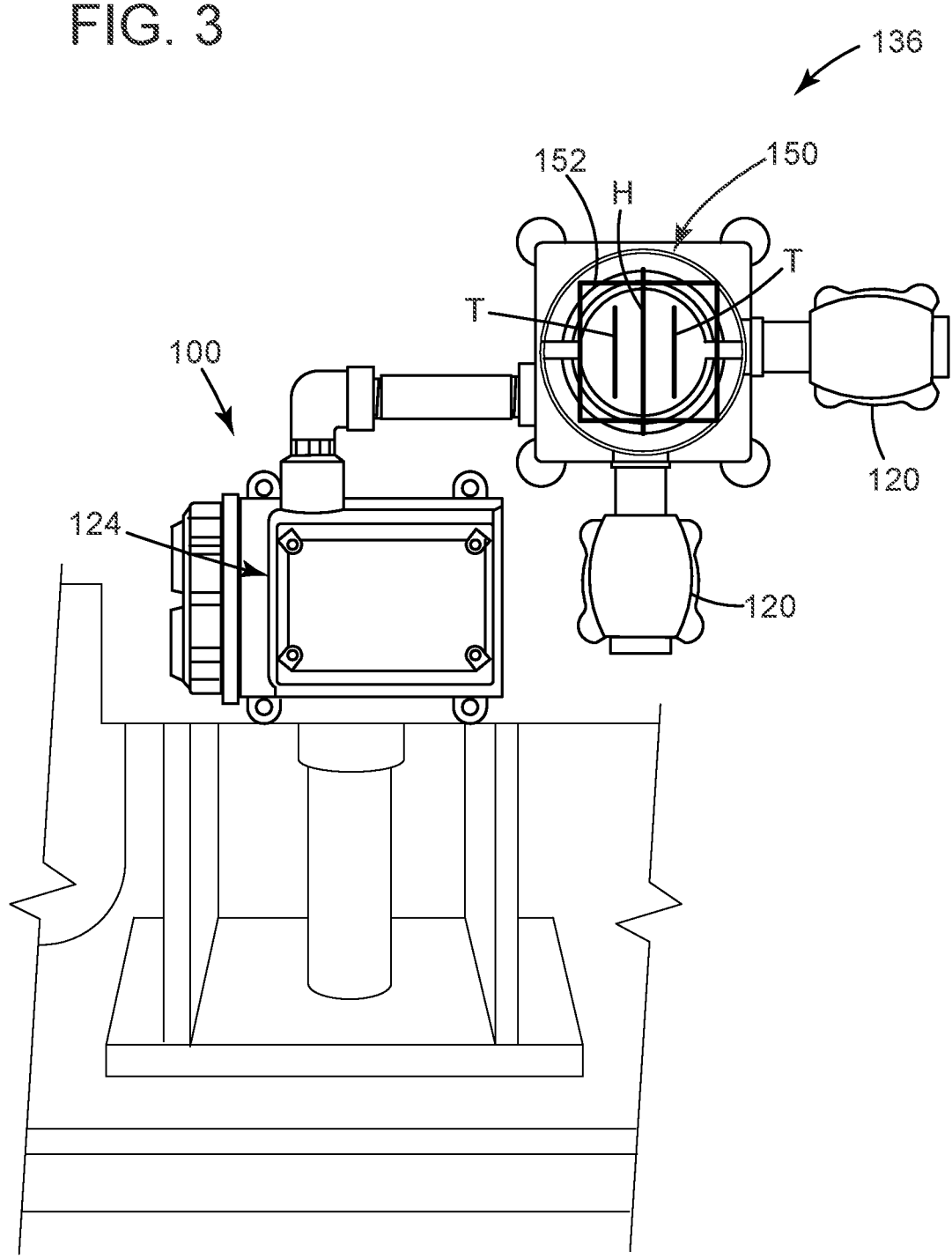
FIG. 3 depicts an elevation view of an example of the controller of FIG. 1

FIG. 3 depicts an elevation view of structure for another example of the valve system 134. In this example, wiring may extend from the enclosure 124 into a junction box 150 that encloses valve operating hardware 152. The junction box 150 may adopt certain safety features, like explosion-proof design, for the device to comport with hazardous conditions. The operating hardware 152 may include a harmonic seal H that separates a pair of terminal strips T. The harmonic seal H may prevent gas flow between the terminal strips T, thus operating as another safety measure to avoid ignition of residual gas in proximity to the flow control 108. The terminal strips T may couple with a pair of single-acting solenoid valves 120; however, this disclosure contemplates use of one double acting solenoid valve 120 as well. In one implementation, opening and closing the solenoid valve(s) 120 can adjust position of the closure member 116 in the valve body 110.

Figure 4:
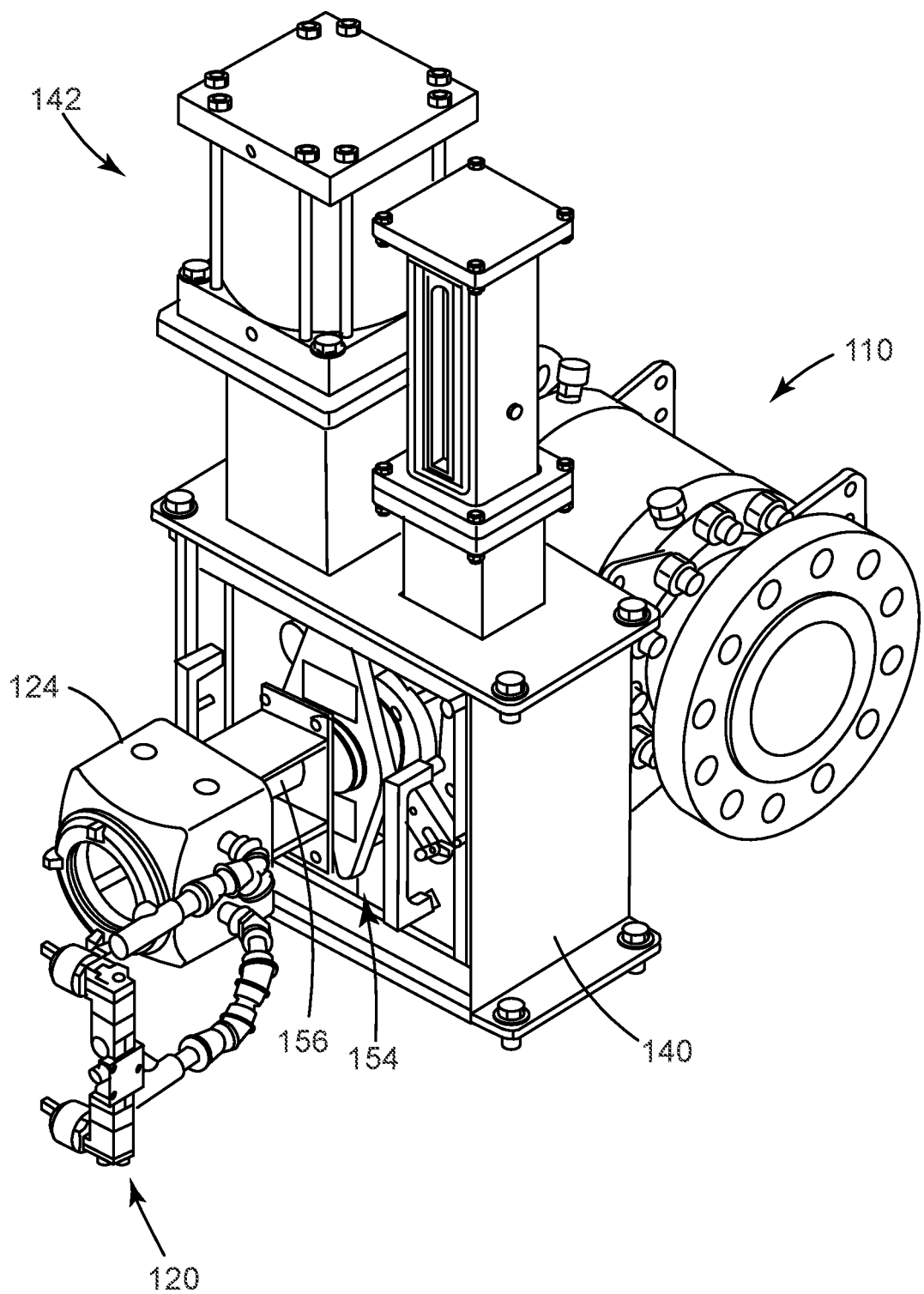
FIG. 4 depicts a perspective view of the example of FIG. 2.

FIG. 4 depicts the structure of FIG. 2 with a panel removed from the base 140. In one implementation, a torque assembly 154 may couple with the load generator 142. The torque assembly 154 may include a shaft 156 with one end that resides outside of the base 140 in proximity to the enclosure 124 of the controller 100. This end may extend into the enclosure 124, as well. The shaft 156 may have a second end that secures to the closure member 116 of the flow control 108. This configuration of the torque assembly 154 may couple the sensor 122 with the closure member 116. In this way, the controller 100 may monitor the position of the closure member 116.

Figure 5:
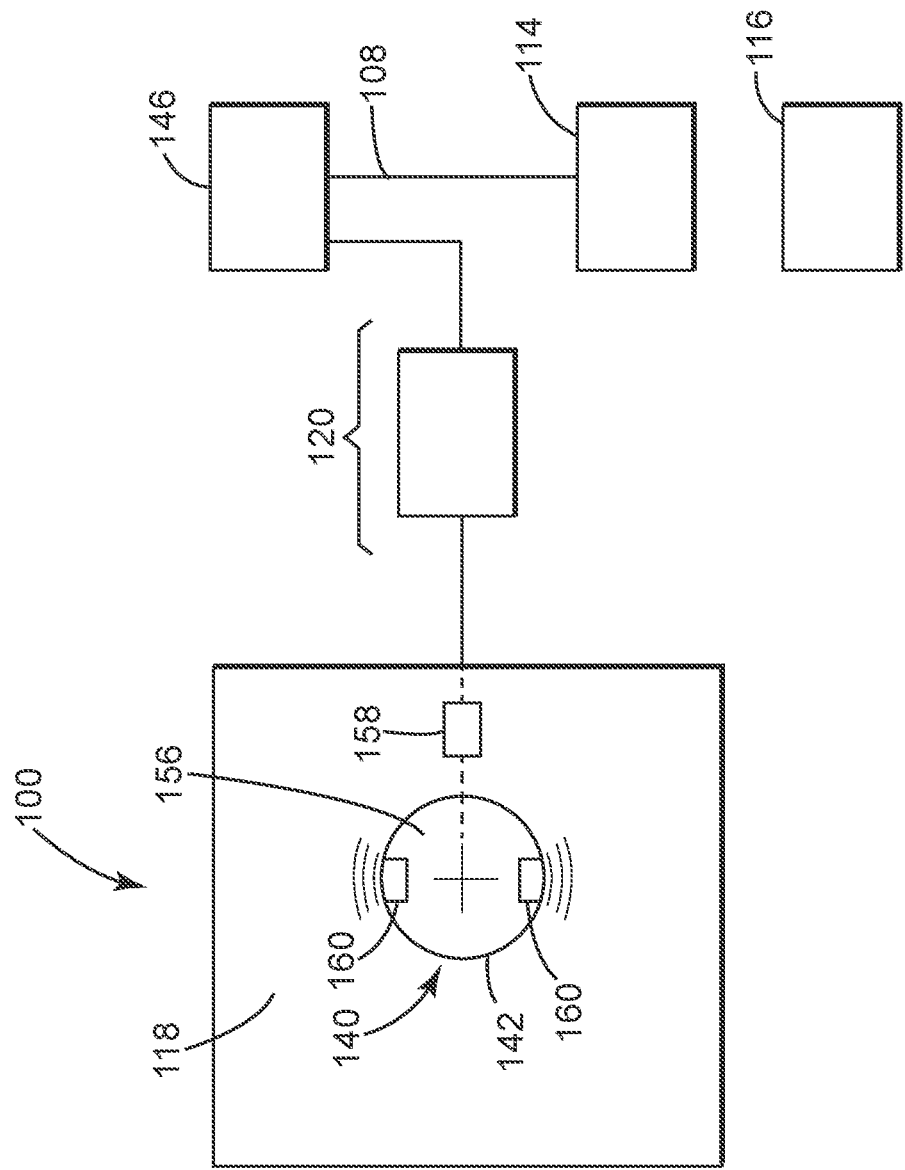
FIG. 5 depicts a schematic diagram of an example of the controller of FIG. 1.

FIG. 5 depicts a schematic diagram of an example of the controller 100. The sensor 122 may embody a magnetic flux sensor 158, although this disclosure contemplates use of other device technology, like ultrasonic, piezoelectric, or optically sensitive, as well. The magnetic flux sensor 158 may integrate as a component into or as part of the operating hardware 118. The end of the shaft 152 may reside proximate the magnetic flux sensor 158. In one example, the end may carry a pair of magnets 160. The pair may be annularly offset from one another, for example, by 180°. In use, the magnets 160 assume a position concomitant with the angular orientation of the shaft 152, which itself reflects the position of the closure member 116 (e.g., relative to the seat 114). The magnetic flux sensor 158 resides proximate the shaft 152 so that data corresponds with changes in polarity from the rotating magnets 160. The operating hardware 118 may correlate these changes to identify the position for the closure member 116. In one implementation, the magnetic flux sensor 158 may assume a first position, shown here to align the magnetic flux sensor 158 on or with the center of rotation (C) for the shaft 152. This first position often corresponds with the default orientation for the valve positioner 100 on the flow control 108.

Figure 6:
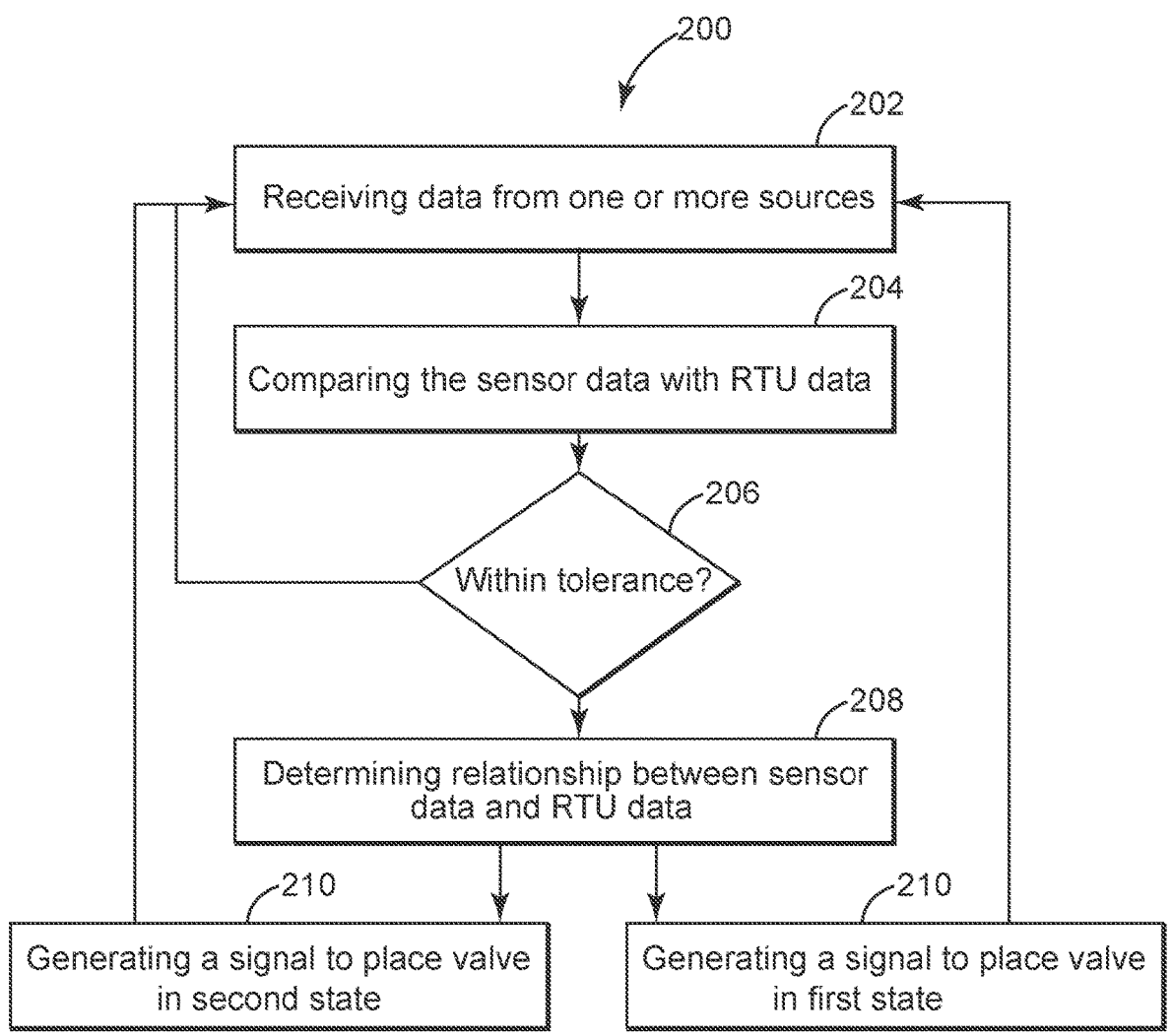
FIG. 6 depicts a flow diagram of a method for operating the controller of FIG. 1.

FIG. 6 depicts a flow diagram of a method 200 for operating the controller 100 of FIG. 1. The steps of the method may correspond with executable instructions, like computer or software programs, that configure the controller 100 for certain operations. The instructions may, for example, process data to arrive at values that define operation of the flow control 108. These operations may identify the position of the closure member 114 and, in turn, make adjustments in this position as necessary for the flow control 108 to operate in a process line. In one implementation, the method 200 may include, at step 202, receiving data from one or more sources. This data may, for example, originate from the sensor 122 as information about the position of the closure member 114. The data may also originate from the RTU. This data may instruct the controller 100 as to the actual, process position for the closure member 114. At step 204, the method 200 may include comparing the sensor data from sensor 122 with data from a remote terminal unit ("RTU"). This may include, at stage 206, determining whether the signals are within an acceptable tolerance of one another. If so, then the method 200 may continue to receive data (at step 202). If not, then the method 200 may continue, at step 208, to determine the relationship between the sensor data and the RTU data. This relationship may indicate that the closure member 114 is too far open or too far closed from its commanded position. If too far closed, then the method 200 may continue at step 210 to generate a signal that changes state of the solenoid to allow gas to pressurize a first side of the pneumatic cylinder 146 (and vent from a second side), which changes the position of the closure member 114 and opens the flow control 108. On the other hand, if the valve is too far opened, then the method 200 may continue at step 212 to generate a signal that changes state of the solenoid to allow gas to pressurize the second side of the pneumatic cylinder 146 (and vent from the first side), which changes the position of the closure member 114 and closes the flow control 108.

In view of the foregoing, the improvements herein leverage designs that can reduce cost and can eliminate fugitive emissions. The embodiments herein leverage, in one example, a Hall-effect sensor to provide feedback that describes position (e.g., a % open) of a control valve. Use of this sensor forecloses the need for mechanical feedback that often requires lengthy movements to register the same position on these types of valves. The device may also leverage a solenoid valve to control pressure in a pneumatic actuator. Use of this valve can eliminate fugitive emissions of, for example, natural gas or like actuating media that pressurizes these types of valve use in the pneumatic actuator.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve assembly, comprising:
an actuator comprising a pneumatic cylinder;
a shaft coupled with the actuator;
a valve coupled with the shaft; and
an actuator control system comprising:
   a controller with a first explosion-proof housing;
   a non-contact sensor disposed inside of the first explosion-proof housing and in proximity to an end of the shaft,
   a junction box with a second explosion-proof housing
   a pair of solenoid valves coupled to both the second explosion-proof housing and the pneumatic cylinder,
   wherein the actuator control system configured to transfer a signal from the first explosion-proof housing to the second explosion-proof housing, and
   wherein the signal changes a state of each of the pair of solenoid valves that results in a change in position of the valve by pressurizing a first side of the pneumatic cylinder and depressurizing a second side of the pneumatic cylinder.

2. The valve assembly of claim 1, wherein the solenoid valves comprise a double-acting solenoid.

3. The valve assembly of claim 1, wherein the solenoid valves comprises a single acting solenoid.

4. The valve assembly of claim 1, further comprising:
magnets disposed on the end of the shaft in proximity to the non-contact sensor.

5. The valve assembly of claim 1, wherein the non-contact sensor comprises a Hall-effect sensor.

6. The valve assembly of claim 1, further comprising:
a torque unit coupled to the pneumatic cylinder and the shaft.

7. The valve assembly of claim 1, wherein the non-contact sensor is configured to generate a signal that corresponds with a % open position for the valve.

8. The valve assembly of claim 1, wherein the signal corresponds with an increase in pressure on one side of the pneumatic cylinder.

9. A valve assembly, comprising:
a pneumatic cylinder;
a valve coupled with the shaft;
a controller with a first explosion-proof housing and a Hall-effect sensor disposed therein;
a junction box with a second explosion-proof housing;
a pair of solenoid valves coupled with both the second explosion-proof housing and the pneumatic cylinder,
wherein the controller is coupled to the pair of solenoid valves,
wherein the controller is configured to generate a signal that transfers from the first explosion-proof housing to the second explosion-proof housing to change a state of the pair of solenoid valves in response to signals from the Hall-effect sensor, and
wherein the state of each of the pair of solenoid valves results in a change in position of the valve by pressurizing a first side of the pneumatic cylinder and depressurizing a second side of the pneumatic cylinder.

10. The valve assembly of claim 9, further comprising:
a terminal circuit inside the second explosion-proof housing that connects the controller to the solenoid valve.

11. The valve assembly of claim 9, wherein the state of the solenoid valve corresponds with an increase or a decrease in pressure in the pneumatic cylinder.

12. A valve, comprising:
a pneumatic actuator;
a torque unit coupled with the pneumatic actuator;
a shaft coupled with the torque unit;
a Hall effect sensor in proximity to a first end of the shaft;
a valve coupled with a second end the shaft;
a first explosion-proof housing comprising control hardware coupled with the Hall effect sensor;
a junction box with a second explosion-proof housing; and
a pair of solenoid valves coupled with the second explosion-proof housing and the control hardware,
wherein the control hardware is configured to generate a signal that transfers from the first explosion-proof housing to the second explosion-proof housing to change state of each of the pair of solenoid valves in response to a signal from the Hall effect sensor, and
wherein the state of each of the pair of solenoid valves results in a change in position of the valve by pressurizing a first side of the pneumatic cylinder and depressurizing a second side of the pneumatic cylinder.

13. The valve of claim 12, further comprising:
magnets disposed on the first end of the shaft.

14. The valve of claim 12, further comprising:
a closure member coupled to a second end of the shaft,
wherein the signal corresponds with a position of the closure member.

15. The valve of claim 12, wherein the signal corresponds with pressure in the pneumatic cylinder.

16. The valve of claim 12, wherein the signal corresponds with an increase in pressure on a first side of the pneumatic cylinder.

* * * * *